US008214372B2

(12) United States Patent
Gupta et al.

(10) Patent No.: US 8,214,372 B2
(45) Date of Patent: Jul. 3, 2012

(54) DETERMINING CONFIGURATION PARAMETER DEPENDENCIES VIA ANALYSIS OF CONFIGURATION DATA FROM MULTI-TIERED ENTERPRISE APPLICATIONS

(75) Inventors: Manish Gupta, New Delhi (IN); Vinod Ramachandran, Pune (IN); Manish Sethi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 12/465,036

(22) Filed: May 13, 2009

(65) Prior Publication Data

US 2010/0293168 A1 Nov. 18, 2010

(51) Int. Cl.
*G06F 17/30* (2006.01)
(52) U.S. Cl. .......... 707/748; 707/769; 717/168
(58) Field of Classification Search .......... 707/748, 707/769
See application file for complete search history.

(56) References Cited

U.S. PATENT DOCUMENTS

| 6,286,047 | B1 | 9/2001 | Ramanathan et al. | |
|---|---|---|---|---|
| 7,430,594 | B2 | 9/2008 | Krupczak | |
| 7,904,892 | B2 * | 3/2011 | Babb et al. | 717/144 |
| 2007/0094256 | A1 | 4/2007 | Hite et al. | |
| 2007/0240147 | A1 * | 10/2007 | Bernabeu-Auban et al. | 717/170 |
| 2007/0300204 | A1 * | 12/2007 | Andreev et al. | 717/104 |

OTHER PUBLICATIONS

The Open Group: Bookstore & Downloads, Application Response Measurement (ARM), ISBN 1859122116, Jul. 1998, http://www.opengroup.org/products/publications/catalog/c807.htm, p. 1.
Common Information Model (CIM) Standards, http://www.dmtf.org/standards/cim/, 2009, p. 1.
DataSource, http://java.sun.com/j2se/1.4.2/docs/guide/jdbc/getstart/datasource.html, pp. 1-6, 2009.
Software Support, http://www-01.ibm.com/software/support/isa/, pp. 1-2, 2009.
Barcia et al., IBM WebSphere Developer Technical Journal: Building SOA solutions with the Service Component Architecture—Part 3, http://www.ibm.com/developerworks/websphere/techjournal/0602_barcia/0602_barcia.html, pp. 1-30, 2006.
IBM Tivoli Common Data Model: Guide to Best Practices, http://www.redbooks.ibm.com/abstracts/redp4389.html, 2009, pp. 1-2.
Sample Scripts for WebSphere Application Server Versions 5 and 6, http://www.ibm.com/developerworks/websphere/library/samples/SampleScripts.html, pp. 1-2, 2006.

(Continued)

*Primary Examiner* — John E Breene
*Assistant Examiner* — Albert Phillips, III
(74) *Attorney, Agent, or Firm* — Ryan, Mason & Lewis, LLP

(57) ABSTRACT

Configuration parameter name-value pairs are obtained for each of a plurality of component instances in a deployed software solution. A candidate set of configuration dependencies between different ones of the plurality of component instances in the deployed software solution is identified, based on the configuration parameter name-value pairs. The candidate set of configuration dependencies includes true dependencies and false dependencies. The candidate set of configuration dependencies is rank-ordered to obtain a rank-ordered list, such that a probability of the true dependencies getting a higher rank is greater than a probability of the false dependencies getting a higher rank.

18 Claims, 7 Drawing Sheets

OTHER PUBLICATIONS

Arwe et al., Service Modeling Language, Version 1.0, Mar. 21, 2007, http://www.w3.org/Submission/sml/, pp. 1-25.
Sun Gathering Debug Data, http://www.sun.com/service/gdd/index.xml, pp. 1-2, 2009.
Talwar et al., Approaches for Service Deployment, IEEE Internet Computing, 2005, pp. 70-80.
DeLima et al., The Support Authority: Get to know the Visual Configuration Explorer, http://www.ibm.com/developerworks/websphere/techjournal/0710_supauth/0710_supauth, pp. 1-11, 2007.
What Do You Need from a Configuration Management Database (CMDB)? bmcsoftware, pp. 1-15, 2006.
Chen et al., Automatic Network Application Dependency Discovery: Experiences, Limitations, and New Solutions, pp. 1-14, 2008.
Stapley et al., Biobibliometrics: Information Retrieval and Visualization from Co-occurences of Gene Names in Medline Abstracts, Pacific Symposium on Biocomputing 5:526-537 (2000).
Popov et al., Co-occurrence and Ranking of Entities, pp. 1-14, 2008.
Brown et al., An Active Approach to Characterizing Dynamic Dependencies for Problem Determination in a Distributed Environment, pp. 1-14, 2001.
Brown et al., A Model of Configuration Complexity and its Application to a Change Management System, pp. 1-14, 2005.
Bahl et al., Discovering Dependencies for Network Management, pp. 1-6, 2006.
Choi et al., An Alarm Correlation and Fault Identification Scheme based on OSI Managed Object Classes, 1999 IEEE, pp. 1547-1551, 1999.
Cilibrasi et al., The Google Similarity Distance, pp. 1-16, 2007.
Yemini et al., High Speed and Robust Event Correlation, IEEE Communications Magazine, May 1996, pp. 82-90.
Patterson et al., Recovery Oriented Computing (ROC): Motivation, Definition, Techniques, and Case Studies, Computer Science Technical Report, pp. 1-16, 2002.
Kar et al., Managing Application Services over Service Provider Networks: Architecture and Dependency Analysis, Proceedings of the Seventh IEEE/IFIP Network Operations and Management Symposium (NO MS 2000), Honolulu, HI, USA, Apr. 2000, pp. 1-14.
Ivkovic et al., Using Formal Concept Analysis to Establish Model Dependencies, Proceedings of the International Conference on Information Technology: Coding and Computing (ITCC'05), pp. 1-8, 2005.
Haas, Beauty and the Beast: The Theory and Practice of Information Integration, IBM Almaden Research Center, pp. 1-17, 2007.
Ensel, New Approach for Automated Generation of Service Dependency Models, Munich Network Management Team, pp. 1-12, 2001.
Bagchi et al., Dependency Analysis in Distributed Systems using Fault Injection: Application to Problem Determination in an e-commerce Environment, IBM Thomas J. Watson Research Center, pp. 1-14, 2001.
Eilam et al., Managing the Configuration Complexity of Distributed Applications in Internet Data Centers, IEEE Communications Magazine, Mar. 2006, pp. 166-177.
Gligorov et al., Using Google Distance to Weight Approximate Ontology Matches, WWW 2007, May 8-12, 2007, pp. 1-9.
Gruschke, Integrated Event Management: Event Correlation Using Dependency Graphs, Department of Computer Science, University of Munich, DSOM'98, pp. 1-12, 1998.
Haas et al., Clio Grows Up: From Research Prototype to Industrial Tool, SIGMOD 2005 Jun. 14-16, 2005, pp. 805-810.
Steinder et al., The Present and Future of Event Correlation: A need for End-to-End Service Fault Localization, Computer and Information Sciences Department, University of Delaware, pp. 1-6, 2001.
Formal Concept Analysis, Wikipedia, pp. 1-5, 2010.
Gupta et al., Discovering Dynamic Dependencies in Enterprise Environments for Problem Determination, DSOM 2003, LNCS 2867, pp. 221-233, 2003.
Service-Centric Computing Poised to Reshape Enterprise Infrastructure, According to IDC, 1996-2010 PR Newswire Association LLC, pp. 1-2, 2003.
Fault Detection and Isolation, Wikipedia, pp. 1-2, 2010.
Event Correlation, Wikipedia, pp. 1-4, 2010.
Fault Management, Wikipedia, pp. 1-2, 2010.
Oppenheimer et al., Why Do Internet Services Fail, and What Can Be Done About It? 4th Usenix Symposium on Internet Technologies and Systems (USITS '03), 2003, pp. 1-15, 2003.
Pauls et al., Reuse Frequency as Metric for Dependency Resolver Selection, CD 2005, LNCS 3798, pp. 164-176, 2005.

* cited by examiner

FIG. 2

| NOTATION | DEFINITION |
|---|---|
| $S$ | A SOLUTION (POSSIBLY DISTRIBUTED) COMPRISING OF MULTIPLE COMPONENTS |
| $C_t$ | $t^{th}$ COMPONENTS IN $S$, e.g., APPLICATION SERVER INSTANCE |
| $C_{ti}$ | $i^{th}$ INSTANCE OF COMPONENT TYPE $C_t$, IN A SOLUTION $S$, WHERE $i$ IS AN INTEGER INDEX |
| $C_t.n_a$ (OR $C_{ti}.n_a$) | $n_a$ IS A CONFIGURATION PARAMETER IN A COMPONENT TYPE $C_t$ (OR IN A COMPONENT INSTANCE $C_{ti}$), FOR EXAMPLE "DATABASE NAME" COULD BE A PARAMETER OF A DATABASE SERVER AND ITS INSTANCES |
| $V(C_{ti}.n_a)$ | VALUE ASSUMED BY $n_a$ IN $C_{ti}$, FOR EXAMPLE, "DATABASE NAME" PARAMETER MAY ASSUME VALUE "EmployeeDB" FOR AN INSTANCE $C_{ti}$ OF A DATABASE SERVER |
| $\mathcal{J}$ | CANDIDATE SET OF DEPENDENCIES BETWEEN TWO PARAMETERS EACH BELONGING TO A DIFFERENT COMPONENT INSTANCE IN $S$, SUCH THAT EITHER BOTH PARAMETERS HAVE THE SAME VALUE OR ONE IS A SUBSTRING OF THE OTHER |
| isEncryptedValue(.) | A HEURISTIC FUNCTION THAT TAKES AS INPUT A VALUE OF ANY PARAMETER AND RETURNS TRUE IF IT FINDS IT TO BE ENCRYPTED, OTHERWISE FALSE |
| $\mathcal{J}^E$ | CANDIDATE SET OF DEPENDENCIES BETWEEN ANY TWO PARAMETERS BOTH OF WHOSE VALUES ACCORDING TO THE isEncryptedValue(.) ARE ENCRYPTED |
| $D$ | DEPENDENCY PAIR $(C_{xp}.n_a, C_{yq}.n_b) \in \mathcal{J}$ |
| $R_{DV}(D)$, $R_{IV}(D)$, $R_{goodle}(D)$ | RANK COMPONENT DUE TO "DIFFERENT VALUED", "INFREQUENT VALUED", AND "GOOGLE IT", RESPECTIVELY, FOR A DEPENDENCY PAIR $D$ |
| Rank(D) | AGGREGATE RANK FOR A DEPENDENCY $D$ |

FIG. 3

| | PRODUCTS IN THE SOLUTION | | | |
|---|---|---|---|---|
| | PORTAL SERVER | APPLICATION SERVER | DATABASE SERVER | MESSAGING SERVER |
| SOLUTION 1 | – | 59 | 62 | – |
| SOLUTION 2 | 40 | 66 | 294 | 22 |

FIG. 4

| | # TRUE DEPENDENCIES | $|\mathcal{T}|$ | PRECISION (%) | POSITION FROM TOP OF THE LAST TRUE DEPENDENCY IN SORTED $\mathcal{T}$ |
|---|---|---|---|---|
| SOLUTION 1 | 5 | 23020 | 40 | 11th |
| SOLUTION 2 | 43 | 65536 | 96 | 52nd |

FIG. 5

| | $R_{IV}(D)$ | $R_{DV}(D)$ | $\max(R_{DV}(D), R_{IV}(D)) + R_{DV}(D) * R_{IV}(D)$ | $R_{google}(D)$ |
|---|---|---|---|---|
| PRECISION (SOLUTION 1) | 10% (35th) | 27% (11th) | 27% (11th) | 100% (5th) |
| PRECISION (SOLUTION 2) | 75% (81st) | 2% (3762nd) | 77% (81st) | 76% (51st) |

902 — http://9.184.208.22:5555/contextroot/appcomponent

904 — 'file://localhost/$server_root$/deployed/archive/login.war.webmod/login.war'

DETERMINING CONFIGURATION PARAMETER DEPENDENCIES VIA ANALYSIS OF CONFIGURATION DATA FROM MULTI-TIERED ENTERPRISE APPLICATIONS

FIELD OF THE INVENTION

The present invention relates to the electrical, electronic and computer arts, and, more particularly, to multi-tiered enterprise applications and the like.

BACKGROUND OF THE INVENTION

Multi-tiered enterprise applications, which include many (heterogeneous and possibly loosely coupled) components at various layers of the information technology (IT) stack, typically have configuration dependencies between these different components. A change in the value of a configuration parameter of a component may require changing one or more parameters of other components to the same value. Keeping track of these dependencies is no mean feat as they are typically cross-product and require in-depth product and/or system knowledge.

One prior art approach is set forth in U.S. Pat. No. 6,286,047, which discloses a method and system for automatic discovery of network services. In particular, a method for identifying services, service elements and dependencies among the services and service elements includes executing first and second phases of discovery. In the first phase, the services and service elements are detected, as well as a first set of dependencies. The second phase is based on results of the first phase and is focused upon detecting inter-service dependencies, i.e., conditions in which proper operation of one service relies upon at least one other service. Various techniques may be used in executing the first phase, including accessing information in a domain name service (DNS) of the network to identify dependencies, as well as services and service elements. Discovery within the first phase may also be based upon recognizing naming conventions. Regarding the second phase, one approach to discovering inter-service dependencies is to deploy discovery agents implemented in computer software to access content of configuration files of applications detected in the first phase. Discovery agents may also be used to monitor connections completed via specified service elements detected in the first phase, such that other inter-service dependencies are identified. As an alternative or additional approach, network probes may be deployed to access information of data packets transmitted between service elements detected in the first phase, with the accessed packet information being used to detect inter-service dependencies. When information of the DNS is accessed in the first phase, the information is used as a basis for determining at least some of (1) groups of service elements that are generally equivalent with respect to executing a particular service within the network, (2) hosts supporting virtual hosting, (3) hosts supporting virtual servers, and (4) name servers.

Another prior art approach is set forth in US Patent Publication 2007-0094256, which discloses a system and method for integrating and adopting a service-oriented architecture that utilizes semantic searching. An exemplary system includes an application discovery and semantic analysis software tool. The application discovery and semantic analysis software tool includes a discovery engine that discovers application services, an application resource catalog that stores the discovered application services as software constructs in an application services ontology, and a semantic inference engine that semantically analyzes the software constructs in the application services ontology to determine relationships between the application services and enable more efficient searching of the discovered application services.

SUMMARY OF THE INVENTION

Principles of the invention provide techniques for determining configuration parameter dependencies via analysis of configuration data from multi-tiered enterprise applications. In one aspect, an exemplary method (which can be computer-implemented) includes the step of obtaining configuration parameter name-value pairs for each of a plurality of component instances in a deployed software solution. The method also includes identifying a candidate set of configuration dependencies between different ones of the plurality of component instances in the deployed software solution, based on the configuration parameter name-value pairs obtained in the obtaining step. The candidate set of configuration dependencies includes true dependencies and false dependencies. A further step includes rank-ordering the candidate set of configuration dependencies to obtain a rank-ordered list, such that a probability of the true dependencies getting a higher rank is greater than a probability of the false dependencies getting a higher rank.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

One or more embodiments of the invention may offer one or more of the following technical benefits. One can use the configuration information from a correctly running system to quickly create a database of configuration dependencies, leverage the information on the web to determine how closely any two parameters are related, and given any two pairs of configuration parameters, one can know which pair is more likely to be dependent than the other. All of this can be accomplished without any domain knowledge about the system and the products it contains, other than that a way is needed to access the configuration parameters from the system along with their values. Even if an actual system is not available, one or more embodiments of the invention allow construction of an estimate of dependency between two parameters from the information from the web (which includes, for example, anything from product forums, installation scripts, technical articles, and the like).

These and other features, aspects and advantages of the invention will become apparent from the following detailed description of illustrative embodiments thereof, which is to be read in connection with the accompanying drawings.

BRIEF DESCRIPTION OF THE DRAWINGS

FIG. 2 presents a table of key notation;

FIG. 3 presents a table of instances of subcomponents in two exemplary and non-limiting solutions, according to an aspect of the invention;

FIG. 4 presents a table of number of true dependencies, size of the candidate list, precision, and the position of the last true dependency, for the solutions of FIG. 3;

FIG. 5 presents a table showing how different heuristics play-out in sorting the candidate list, for the solutions of FIG. 3;

DETAILED DESCRIPTION OF PREFERRED EMBODIMENTS

Figure 1:
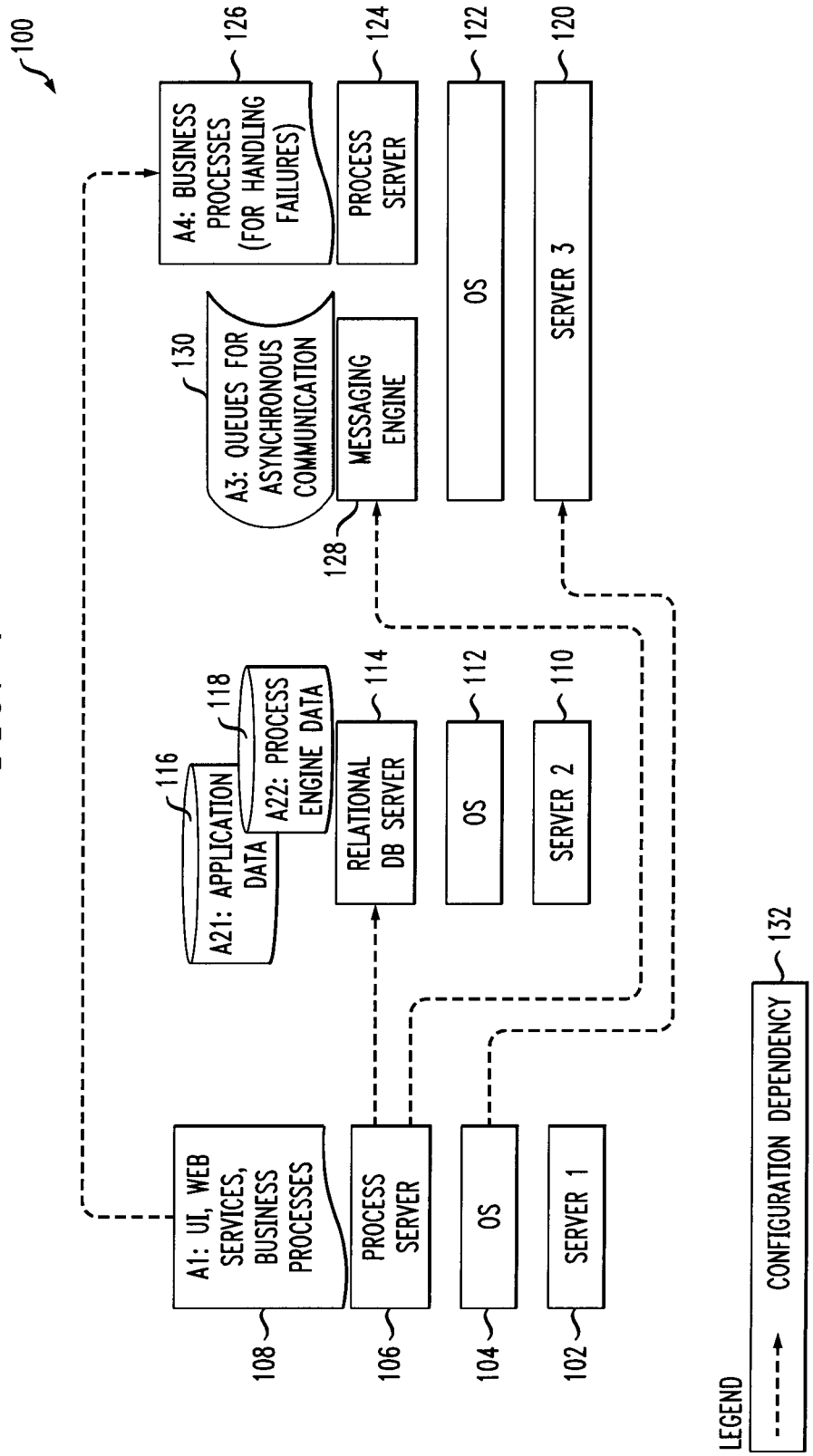
FIG. 1 shows an exemplary deployment topology of a distributed solution, with which one or more techniques of the invention can be employed.

Aspects of the invention provide techniques that do not require a system administrator to have in-depth knowledge about a multi-tiered system in order to be aware of the possible configuration dependencies in a system. One or more embodiments provide a method for analyzing existing deployments (that are functioning properly) to infer the configuration dependencies in a probabilistic sense. Firstly, analyze the values of the configuration parameters of the various components to determine a candidate list of dependencies which includes both true and false ones. Then provide a heuristic that makes use of the statistics on the parameter name and value strings, computed from the configuration data and also the information on the web, to compute a rank for a dependency to be true. One or more instances of the invention provide a rank-ordered list of dependencies which administrators can consult to quickly and systematically identify the true dependencies. Non-limiting experimental examples are presented herein to show the efficacy of exemplary techniques, according to aspects of the invention, on data from two real-world solutions.

In one or more embodiments, extracted configuration data (essentially name-value pairs) is analyzed to determine potential dependencies between the configuration parameters, including the approach of determining these dependencies by using a search service; for example, a web search engine such as the Google® search engine (registered mark of Google Inc., 1600 Amphitheatre Parkway Building 41, Mountain View Calif. 94043).

Data centers are expected to run multi-tiered software-based solutions that have many interdependent components. Managing and maintaining these solutions is a non-trivial task. Configuration errors are considered to be one of the primary causes of failures. A system update could have a cascading effect of requiring changes to several (in the order of hundreds) of other software components and servers. Though subject matter experts are involved in installing and configuring the composite software, currently, there is not a single person who has knowledge spanning the various software and system components (potentially coming from different vendors). In fact, information technology (IT) skill shortage, and the high attrition rate in software development companies, is expected to ensure that the situation continues to stay in this way. However, to analyze the possible cause(s) of a failure, one typically needs a holistic view of these dependencies.

When configuration problems occur in a complex software environment, configuration data (parameter name-value pairs, organized based on the containment structure of the software system) is accessed from the environment including operating system (OS), middleware, and application level components. The concept of a containment structure will be familiar to the skilled artisan from, for example, Aaron B. Brown, Alexander Keller, and Joseph L. Hellerstein, A model of configuration complexity and its application to a change management system, Integrated Network Management 2005, pages 631-644. Different vendors provide tools to access such configuration data from a system, and then possibly visualize and/or analyze the data for problems, to compute the possible impact of a system update before it is applied, or for post-problem debugging.

A key function of tools like the IBM Visual Configuration Explorer tool (VCE—a graphical tool that enables system administrators and developers to quickly and conveniently locate specific configuration properties, compare configurations at multiple levels, build graphical representations of configurations, and transfer configurations to other administrators, developers, and technical support professionals; available from International Business Machines Corporation, Armonk, N.Y., USA, and the tool being publicly available at alphaworks and developerworks) is to graphically show the various components' instances (including their configuration information) along with the inter-component dependencies. For example, if a solution deployment contains application servers and databases, then the tool can show all the application server instances and database instances with their contained configuration components (such as a DataSource object within an application server instance). The skilled artisan will be familiar with the concept of a DataSource object from, for example, *JDBC™ API Tutorial and Reference, Second Edition: Universal Data Access for the Java™ 2 Platform*, published by Addison Wesley as part of the Java series, ISBN 0-201-43328-1. A DataSource object is the representation of a data source in the Java programming language.

Furthermore, one can see the dependencies between the component instances—for example: a data source instance depends on a database instance if the database name referenced by the data source instance is the same as the alias of the database instance. These dependency rules are encoded as part of such tools and applied to the configuration data input to the tool for analysis. One problem which arises in some settings is in finding experts who are aware of this dependency knowledge. In practice it has been very hard for the vendors (big or small) of the different products to adhere to a particular standard (like Common Information Model (CIM) or Service Modeling Language (SML)) for representing these dependencies for interoperability between tools.

One or more embodiments of the invention provide a method for estimating potential configuration dependencies between different component instances in a software solution without a prerequisite of having domain knowledge about the different products in the solution. In one or more instances, assume that the only available configuration data is in the form of: which component instance is contained in which other component instance, and for each component instance, what are the configuration parameter name-value pairs. It is believed that in at least some instances, it will be easier for a product vendor to just provide tools and/or scripts to access the above configuration data from their product than to provide cross-product dependencies. The term "configuration dependency," as used herein, means that if the value of a parameter in an instance of a component is changed then any other configuration parameter(s) in the solution that are dependent on this parameter must be changed to the same value for the correct operation of the solution. Note that, in one or more embodiments of the invention, it is not necessary to address, for example, how to determine relationships between configuration parameters that affect the performance of a solution (or for that matter any other non-functional requirement).

One or more instances of the invention first analyze the configuration data (accessing such data via vendor specific configuration parameter-access-APIs (application program interfaces)) to estimate a candidate set of configuration dependencies. The candidate set may contain both true and false dependencies. Then, use a heuristics based approach to analyze the parameter name and value strings to estimate certain statistics to finally compute weights for each of the dependencies in the candidate set. A higher weight signifies a higher likelihood of the dependency to be true. The candidate set is then sorted in the descending order of these weights. System administrators can estimate the risk of making a configuration change ahead of time by consulting the sorted list. The sorted list helps a system administrator to identify the true dependencies faster, as they are clustered at the upper part of the list, rather than spending time over false dependencies.

Furthermore, as mentioned above, without feeding any domain knowledge in the tools like VCE, users can view these inter-component dependencies between components belonging to different vendors. Since one or more embodiments of the invention also provide which parameter of a component instance is dependent on which other parameter in a system, activities like server consolidation can be made faster when parameters like internet protocol (IP) addresses, ports, and the like may undergo a change and the sorted candidate list could provide visibility into the potential configuration dependencies ahead of time. Model-driven deployment automation tools, like those discussed in Eilam, T., et al, "Managing the configuration complexity of distributed applications in Internet data centers," IEEE Communications Magazine, Volume 44, Issue 3, March 2006, pages 166-177, require models of these dependencies between different components to be captured. On the other hand, one or more instances of the invention provide a way for lesser-skilled IT personnel to determine (from existing deployments in the data centers) potential configuration dependencies, and create knowledge about dependency constraints for these tools. Aspects of the invention complement the configuration management databases (CMDB) in data centers by providing easy visibility into those configuration dependencies that are typically not even captured by the information model of the CMDBs.

Example Configuration Dependencies

This section presents a few non-limiting examples of pairs of configurations that must have the same values for proper functioning of the solution. Discovering such pairs of configurations, in the absence of domain knowledge, is enabled by one or more embodiments of the invention.

FIG. 1 shows an exemplary deployment topology 100 of a distributed solution. First server 102 hosts a process server 106 that serves user interface (UI) components, web services and business processes of the solution, as in block 108. The operating system (OS) of the first server 102 is shown at 104. Second server 110 hosts a relational database 114 that is used for managing application and business processes' state data 116, 118. The OS of the second server 110 is shown at 112. Third server 120 hosts a process server 124 and a messaging engine 128. Process server 124 runs the failure handling business processes 126 and the messaging engine 128 is used for asynchronous communication 130 between both the process servers 106, 124. The OS of the third server 120 is shown at 122.

Following are some configuration dependency examples; note, as per legend 132, that a dashed line with an arrow indicates a configuration dependency:

The arrow from OS 104 to Third Server 120 depicts that value of a logical machine name in local DNS (e.g. /etc/host) that is the same as the value of IP address configuration of targeted physical (third) server 120;

The arrow from Process Server 106 to Database Server 114 depicts that value of database name configuration in a DataSource in Process Server 106 that is the same as the value of the alias configuration of targeted Database Server 114 instance; and The arrow from A1 108 to A4 126 represents a web service uniform resource locator (URL) of one of the components in A4 being used by one of the components in A1 (the skilled artisan will be familiar with this concept per se from, for example, Integrating SCA modules with imports and exports, available at the URL www dot ibm dot com/developerworks/websphere/techjournal/0602_barcia/0602_barcia.html, and given the teachings herein, will be able to adapt same to one or more embodiments of the invention). The URL in A4 126 is made up by concatenating the various configurations belonging to its container's hosting hierarchy, for example, server IP address, process server port, and the like. This is an example of a configuration value that is a substring of values of other configuration parameters, for e.g. if third server 120's IP address is 9.184.208.22 and process server port is 5555 then the URL could be as shown at 902 in FIG. 9.

It will be appreciated that for purposes of illustrative clarity, a handful of configuration pairs have been described here; however, in an actual solution, the number and types of such dependencies is typically quite large. For instance, in the solution shown in FIG. 1, there are a total of ten occurrences of Data Source configurations. Similarly there are in the range of twenty logical machine names in local domain name servers (DNS) since the solution is designed to support arbitrary distribution of components.

Method for Discovering Dependencies

Configuration Providers

The exemplary method to be discussed in the following sections depends on the ability to extract the configuration information from a deployed solution. Typically, vendors of software components and/or products provide interfaces (including scripts, for example) that can be used to extract configuration information, including parameter name-value pairs, from an instance of the component. The skilled artisan will be familiar with the concept of scripts per se, and, given the teachings herein, will be able to adapt same to implement one or more embodiments of the invention. A non-limiting example of such scripts includes sample scripts for accessing WebSphere® software information (registered mark of International Business Machines Corporation, Armonk, N.Y., USA), available at the address www dot ibm dot com/developerworks/websphere/library/samples/SampleScripts.html.

In one or more embodiments of the invention, existence and knowledge of these interfaces are assumed. Software that integrates such interfaces together to provide a single source of configuration information exists today. One such software is the aforementioned Visual Configuration Explorer (VCE). This software extracts the configuration parameter name-value pairs for each component in each product. Additionally, it also provides the component containment hierarchy (as noted above, the concept of a containment structure will be familiar to the skilled artisan from, for example, Aaron B. Brown, Alexander Keller, and Joseph L. Hellerstein, A model of configuration complexity and its application to a change management system, Integrated Network Management 2005, pages 631-644). The different products that VCE currently caters to are the application server, portal server, database server, and messaging server from specific implementations of the components offered by International Business Machines Corporation, Armonk, N.Y., USA. VCE's visualization interface can be used to view the configuration relationships between different components of a solution. The rules to determine these relationships are hard coded into the tool. In one or more embodiments of the invention, VCE is used only to obtain the configuration information (name-value pairs) from component instances in a solution. It should be noted that though VCE has been used for the non-limiting experimental examples set forth herein, the approach of one or more embodiments is independent of how the provider code was written, as long as it is possible to obtain a hierarchy of name-value pairs corresponding to the configuration of the components. For example, instead of VCE, a CMDB could have been employed to obtain the name-value pairs. The skilled artisan will be familiar with the concept of a CMDB per se, and given the teachings herein, will be able to adapt same for use with one or more embodiments of the invention. A non-limiting example of a suitable CMDB is given in the article "What Do You Need from Configuration Management Database (CMDB)?" which is available at the URL: http colon slash slash documents dot bmc dot com/products/documents/12/03/61203/61203.pdf Definition of 'Configuration Dependency' as Used Herein Note that the table of FIG. 2 presents a useful notation list for reference purposes. Let a solution S:={$c_{ti}$: where $c_{ti}$ is $i^{th}$ instance of component type $C_t$, in a solution S, where i is an integer index}. It is very well possible that a component type may be a sub-component type of another component. As an example, a solution may include 4 instances of $C_1$, defined to be of type application server, 3 instances of $C_2$, defined to be of type database server, 1 instance of $C_3$, defined to be of type directory server, and 4 instances of $C_4$, defined to be of type data source (note that the data source type is a sub-component type of application server type). Then S={$C_{11}, C_{12}, C_{13}, C_{14}, C_{21}, C_{22}, C_{23}, C_{31}, C_{41}, C_{42}, C_{43}, C_{44}$}.

Associated with each component type $C_t$, there are configuration parameters that may assume different values for different instances $C_{ti}$ of $C_t$ in the solution S. A configuration parameter with name $n_a$ in a component type $C_t$ (or in a component instance $C_{ti}$) is uniquely denoted as $C_t.n_a$ (or $C_{ti}.n_a$), respectively.

A configuration dependency is defined to exist between $C_{xp}.n_a$ and $C_{yq}.n_b$, whenever, for the proper or desired functioning of S, the value of $C_{xp}.n_a$ must either be equal or be a substring of the value of $C_{yq}.n_b$, or vice versa. The dependencies in the section above on example configuration dependencies are examples of dependencies which satisfy the above definition.

As mentioned above, there are dependencies where one parameter's value is a substring of another parameter's value. For example, in an instance of a solution including WebSphere® Portal Server software and WebSphere® Application Server software, the former has a configuration parameter called URL with value 904 in FIG. 9, which has as substring the value 'login.war' of a parameter called URI belonging to the latter product. If the values of the parameters are encrypted (for example passwords) then apply the above definition of configuration dependency to the unencrypted values. In some variables it is possible that via a method of translation and/or substitution, the values are equated: as an example one variable might explicitly have an "IP address" as its value while the other variable may have a machine name as its value, but the two are definitely dependent if the logical machine name translates to the IP address. For illustrative purposes, in one or more embodiments, assume that the configuration provider has translated the values of parameters that require translation. The examples of dependencies discussed above are of the type defined in this section and are under the purview of one or more instances of the invention. As mentioned earlier, these dependencies are unknown and one or more instances of the invention provide techniques to discover them from actual deployments or by analyzing the information on the web. Embodiments of the invention address the problem of estimating configuration dependencies by observing the configuration from a working system.

Overall Approach for Analyzing the Configuration of a Large Enterprise Deployment Based on interactions with solution deployment experts, it is believed that currently, a modest sized enterprise solution deployment typically includes at least six component types with an average of two instances per type. Further, each component instance may have around one hundred configuration variables. Given that one does not have any more domain knowledge than the existence of parameter name-value pairs, and supposing (for simplicity) that there is only one configuration dependency in the entire solution, then in the worst case there are approximately $^6C_2*2^2*100^2=600,000$ possibilities to consider for discovering this dependency. The number of parameters to consider can be reduced by carrying out a linear scan of all the 6*2*100 parameters and grouping them together if they have the same value or are a substring of another, and considering only the parameter combinations within each group. The task of identifying the true dependency is difficult because the search space can be huge and there may be no domain knowledge about which parameter is dependent on which other. An exemplary technique that analyzes configuration parameter name-value pairs for discovering the configuration dependencies in a software solution, according to an aspect of the invention, involves the following steps:

Step 0: Use a configuration provider to obtain configuration parameter name-value pairs for each component instance, Step 1: Identify a candidate set of configuration dependencies that may contain both true (the actual dependencies it is desired to discover) and false (those that are not true but are also suggested by the method) dependencies by analyzing the information provided by Step 0, and then Step 2: Rank order the list of candidate dependencies such that the probability of true dependencies getting a higher rank is greater than that of the false ones.

The success of this approach can be judged, for example, by what percentage of the true dependencies in a target solution deployment are discovered (called accuracy), and amongst the ones that the method discovers, whether it is possible to rank order them with a higher chance for the true dependencies to occupy the top slot as compared to the false ones (called precision). In one or more embodiments, accuracy is a property of Step 1 while precision is a property of Step 2. Step 0 was discussed above in the section on configuration providers. Steps 1 and 2 of the method will now be discussed in more detail.

Step 1: Identifying a Candidate Set of Dependencies: The definition of 'Dependency' given above is of significance in the approach adopted here. Given a solution S, an application of Step 0 provides the parameter name-value pairs for each component instance. The values are treated as character strings, as typically a provider may not provide parameter type information. Define a string operator '$\subseteq$' to denote either an equality or substring relationship between two strings, that is, if $s_1 \subseteq s_2$ then either $s_1$ is equal to or is a substring of $s_2$. Hereinafter, including the claims, "$\subseteq$" is referred to interchangeably as the "substring" operator. For any parameter, $C_{ti}.n_a$, let $V(C_{ti}.n_a)$ denote the value it assumes in a given S. Step 1 computes a candidate set $\Im$ as follows:

$$\Im := \{(C_{xp}.n_a, C_{yq}.n_b): V(C_{xp}.n_a) \subseteq V(C_{yq}.n_b) \text{ or}$$
$$V(V_{yq}.n_a) \subseteq V(C_{xp}.n_a), x < y, C_{xp} \in S, C_{yq} \in S\}, \quad (1)$$

is the candidate set of dependencies (could include both true and false dependencies) between any two configuration parameters belonging to different component types in S, such that the parameter values are either equal or one is a substring of the other.

As mentioned above, there are parameters that could be encrypted and require special handling. In one or more instances, assume that if a parameter's value is encrypted then all dependent parameters (in the sense of the definition above) in the solution also have their values encrypted. Let isEncryptedValue(.) be a heuristic function that takes as input a value of any parameter and outputs true if it finds it to be encrypted otherwise false. In one or more embodiments, the function is based on the properties of the typically used encryption methods, such as MD5 or SHA-1. The function simply considers the size of the input value string—if it is contiguous and has a size (i.e., the number of characters in a string) equal to the size of the message digest produced by any of MD5 or SHA-1 then it returns true otherwise false. MD5 (Message-Digest algorithm 5) is a widely used cryptographic hash function with a 128-bit hash value. The SHA hash functions are a set of cryptographic hash functions designed by the National Security Agency (NSA) and published by the NIST as a U.S. Federal Information Processing Standard. SHA stands for Secure Hash Algorithm. SHA-1 is employed in several widely used security applications and protocols.

For example, MD5 has 32 hexadecimal characters while SHA-1 has 40. Other encryption methods can simply be supported by enhancing the function to look at a new method's message digest size as well. Now define $\Im^E$, the candidate set that includes dependency pairs corresponding to the parameters deemed by isEncryptedValue(.) to be true.

$$\Im^E := \{(C_{xp}.n_a, C_{yq}.n_b): \text{isEncryptedValue}(V(C_{xp}.n_a))$$
$$= \text{true, isEncryptedValue}(V(C_{yq}.n_b)) = \text{true}, x < y,$$
$$C_{xp} \in S, C_{yq} \in S\} \quad (2)$$

The above definition recognizes the fact that, in one or more embodiments, parameters whose values may not be encrypted may also occur as potential dependencies, but if a parameter's value is encrypted then it will surely occur as a dependency with its dependent parameter. It is believed that $\Im^E$ will typically be a very small set as compared to $\Im$, because very few other parameters are typically expected to be encrypted besides passwords.

From the above definitions of $\Im$ and $\Im^E$ the following theorem is straightforward:

Theorem: All the true configuration dependencies (as defined above) in a solution S are contained in $\Im \cup \Im^E$, provided:

1. the configuration provider (see section on configuration providers) provides all the configuration parameter name-value pairs from the solution S that is functioning properly,
2. all the parameters occurring in the true dependencies should assume non-null values, and,
3. the encryption mechanism in the system S should belong to one of the techniques known to the isEncryptedValue (.) function.

Proof: This can easily be shown by contradiction and the definition of configuration dependency above.

The implication of the above theorem is that the accuracy property associated with Step 1 is 100%, provided the assumptions listed above hold, i.e., Step 1 provides a candidate set $\Im \cup \Im^E$ that contains all the true dependencies between any two components $C_{xp}$ and $C_{yq}$ in the solution S.

The next section discusses how to rank order the dependencies in $\Im$ that contain the bulk of the suggested dependencies. Having done that, consider how the dependencies in $\Im^E$ are ordered.

Step 2: Rank Order Discovered Dependencies: The method presented in this section consists of two heuristics, namely, Different and Infrequent Valued Dependencies and Parameter Semantic-distance Estimation Method (PSEM).

With regard to Different and Infrequent Valued Dependencies, as the name suggests, this heuristic leverages frequencies of occurrence of parameter values in a solution S. In one or more embodiments, construct a discriminator for a true dependency in the candidate set. The following two observations are of interest:

Different Valued: a pair of parameters is more likely to be related than another pair, if more instances are found, in $\Im$, of the former pair that are related on different parameter values, than the latter. As an example, consider the solution S in the example above. Assume that types $C_1$, $C_2$, $C_3$ and $C_4$ have a parameter named $n_a$, $n_b$, $n_c$, and $n_d$ respectively. Assume that $C_{41}.n_d$="db1," $C_{42}.n_d$="db2," $C_{43}.n_d$="db3," and $C_{44}.n_d$="db1." Also, let $C_{21}.n_b$="db1," $C_{22}.n_b$="db2," and $C_{23}.n_b$="db3." Further, let $C_{11}.n_a = C_{12}.n_a = C_{13}.n_a = C_{14}.n_a$="user1." Finally, let $C_{31}.n_c$="user1." With this data it can be seen that there are four instances of the dependency between $C_4$'s $n_d$ and $C_2$'s $n_b$, and in all three different values are assumed namely, "db1," "db2," and "db3." Similarly, there are four instances of the dependency between $C_1$'s $n_a$ and $C_3$'s $n_c$ and all of them assume a single value, namely, "user1." Thus, the former dependency assumes three different values as opposed to just one value assumed by the latter one and this gives more confidence in declaring the former as a true dependency than the latter one.

Infrequent Valued: a pair of parameters is more likely to be related than another pair if the former has instances in $\Im$ that are related on parameter values that are occurring more infrequently in the system as opposed to the latter. In order to exemplify this, continue with the above example. Assume that there is another component type $C_5$ with only one instance and having a parameter $n_e$. Further assume that $C_3$ has another parameter $n'_c$. Finally, let both $C_{51}.n_e$ and $C_{31}.n'_c$ form a dependency pair in $\Im$ by virtue of both assuming the same value, say "theOnlyOne," that no other parameter in S assumes, thus making the pair of parameters unique in $\Im$. From the above example, note that there are four instances of the dependency between $C_1$'s $n_a$ and $C_3$'s $n_c$ in $\Im$ that assume the value "user1." By the "Infrequent Valued" heuristic, the former dependency assumes a value which is more infrequent than the latter one, and hence will be given a higher confidence as compared to the latter one.

For simplicity of exposition, in the following discussion, assume that all the dependencies in $\Im$ are based on equality but the substring case can easily be handled in a similar manner.

Before delving into the method detail, some terminology will be outlined:

Let $\Im_{C_xC_yab}:=\{(C_{xp}.n_a, C_{yq}.n_b) \in \Im=\}$ be the set of all the dependencies in $\Im$ between parameter $n_a$ of $C_x$ and parameter $n_b$ of $C_y$ across all the instances of the two components.

Let $\aleph_{C_xC_yab}:=\{V(C_{xp}.n_a): (C_{xp}.n_a, C_{yq}.n_b) \in \Im_{C_xC_yab}\}$ be the set of all the different values that the dependency pairs in $\Im_{C_xC_yab}$ assume.

Let $\aleph:=\cup_{xyab}\aleph_{C_xC_yab}$, be the set of all possible values that the dependencies in $\Im$ assume.

For any $D:=(C_{xp}.n_a, C_{yq}.n_b) \in \Im$, the rank component due to 'Different Valued' dependencies is defined as:

$$R_{DV}(D):=|\aleph_{C_xC_yab}|/|\aleph|. \quad (3)$$

The nature of this rank component is that as $|\aleph_{xyab}|$ (where, $|.|$ stands for the modulus of a set) increases, the rank component increases as well, and has values in [0, 1].

To capture the rank component due to the 'Infrequent Valued' dependencies, first 1 5 define, $f(v):=|\{(C_{xp}.n_a, C_{yq}.n_b) \in \Im: v=V(C_{xp}.n_a)\}|$ to be the number of dependency pairs in $\Im$ that assume value v.

For any $D:=(C_{xp}.n_a, C_{yq}.n_b) \in \Im$, the rank component due to 'Infrequent Valued' dependencies is defined as:

$$R_{IV}(D):=(1-f(V(C_{xp}.n_a))/|\Im|). \quad (4)$$

This rank component favors dependencies with parameter values that occur infrequently.

With regard to PSEM, this heuristic leverages the parameter names and knowledge about which product a parameter belongs to, in order to query the Internet to provide an estimate of a dependency between a pair of configuration parameters. In one or more embodiments, the PSEM searches any information on the web (articles, tutorials, tags, installation scripts, and the like) to compute the "semantic distance" between any two parameters. In one or more embodiments of the invention, PSEM computes a semantic distance measure such as the Normalized Google Distance (NGD), a measure of semantic interrelatedness derived from the number of hits returned by a search engine, such as the Google® search engine, for a given set of keywords. As pointed out in Cilibrasi, R., Vitanyi, P., The Google similarity distance, IEEE Transactions on knowledge and data engineering 19(3) (2007), page 370-383, immense knowledge is available from the Internet in estimating the rank order. The PSEM heuristic can leverage such knowledge. There are people who use the Internet for discussing and publishing information that directly or indirectly could lead to an estimate of whether there is a dependency between a pair of parameters. The following are some reasons why such information may exist on the web:

These inter-parameter dependencies are important, and not knowing them could eventually cause faulty installs or a systems outage induced by configuration changes in the system. This could lead people to discuss (for example, on product support Internet forums) the problems they are facing or they have solutions for, Product configuration details are published by the product vendor discussing how the product needs to be configured with respect to another product, Some people or the vendor itself may also publish product configuration scripts, and Articles and documents discussing product relationships may be written and published.

A significant observation in the above is that if any two parameters are dependent, then it is very likely that they co-occur on a web page. In one or more embodiments of the invention, take this co-occurrence of the parameter names in a web document as an indication of a dependency between the two. Embodiments of the invention employ a measure that captures the dependency between any two parameters by using the information on the web. As known to the skilled artisan from, for example, the above-mentioned Cilibrasi papers, one non-limiting example of such a measure, as introduced above, is the so-called Normalized Google Distance or $NGD(c_1, c_2)$, for the symmetric conditional probability for the co-occurrence of any two terms, $c_1$ and $c_2$. With regard to the symmetric conditional probability, the skilled artisan will be familiar with same from, for example, R. Gligorov, et al., Using Google Distance to Weight Approximate Ontology Matches, In WWW 2007, May 8-12, 2007, Banff, Alberta, Canada. Given the teachings herein, the skilled artisan will be able to adapt techniques, such as those of Cilibrasi and Gligorov, to implement aspects of the invention.

More Concretely:

$$NGD(c_1, c_2) = \frac{\max\{\log f(c_1), \log f(c_2)\} - \log(f(c_1, c_2))}{\log M - \min\{\log f(c_1), \log f(c_2)\}},$$

where, $f(c_1)$, $f(c_2)$, and $f(c_1,c_2)$ are the number of Google® search engine hits for search terms $c_1$, $c_2$, and $c_1 c_2$, respectively, and M is the number of web pages indexed by the Google® search engine. The higher the $NGD(c_1, c_2)$ value, the more semantically distant are the terms $c_1$ and $c_2$. Further, $NGD(c_1, c_2):=1$ if any of $f(c_1)$, or $f(c_2)$ are zero. Similar techniques with other search engines could also be employed.

Next, some notation is introduced and then elaboration is provided regarding how one or more methods, according to aspects of the invention, use NGD:

Let $\mathring{\Im}_{C_xC_y}:=\{(n_a, n_b): (C_{xp}.n_a, C_{yq}.n_b) \in \Im\}$ be the set of all possible parameter name pairs in $\Im$ corresponding to the candidate dependencies between instances of $C_x$ and $C_y$.

For each pair $(n_a, n_b) \in \mathring{\Im}_{C_xC_y}$ calculate $H_{C_xC_yab}:=NGD(n_a, n_b)$, where the $\log_{10}$-value of M is 10.41. M can be estimated by running the following query: com OR www OR org.

Define $H:=\max_{xyab} H_{C_xC_yab}$, where max is taken over all possible components and their parameters in $\Im$.

Thus, the rank component given to a dependency $D:= (C_{xp}.n_a, C_{yq}.n_b) \in \Im$, is defined as $$R_{PSEM}(D):= 1 - \frac{H_{C_xC_yab}}{H}. \quad (5)$$

Note that the NGD for each dependency in $\Im$ has effectively been converted into a 'similarity' by first normalizing the value to [0, 1] interval and then subtracting from 1.

At this point, the construction of the query to calculate $H_{C_xC_yab}$ will be explained. In particular, the query construction methodology is explained through an example.

Query Construction Example: Assume, for some $(n_a, n_b) \in \mathring{\Im}_{C_xC_y}$, that $n_a:=$"databaseName" and $n_b:=$"Database name," with the corresponding components being $C_x:=$WebSphere Datasource and $C_y:=$DB2 Database, which in turn correspond to the WebSphere and DB2 software products, respectively. In order to calculate $NGD(n_a, n_b)$ execute three queries: (a) +"databaseName," (b) +"Database name," and (c) +"databaseName" +"Database name." Since, in one or more embodiments, only relationships between the products like WebSphere and DB2 software products are of interest, append the queries with the corresponding product names as well to reduce the possibility of fetching documents unrelated to the components and products in question. In one or more embodiments, do not use the component names to constrain the query string because in many cases they typically over-constrain the query and the size of the result set is typically closer to zero.

With regard to the Aggregate Rank, first the aggregate rank will be discussed, followed by its rationale:

For any $D:=(C_{xp}.n_a, C_{yq}.n_b) \in \Im$, the aggregate rank is computed as:

$$\text{Rank}(D): = \max(R_{DV}(D), R_{IV}(D), R_{PSEM}(D)) + \quad (6)$$
$$R_{DV}(D) \times R_{IV}(D) + R_{DV}(D) \times R_{PSEM}(D) +$$
$$R_{IV}(D) \times R_{PSEM}(D) + R_{DV}(D) \times R_{IV}(D) \times R_{PSEM}(D).$$

Rationale: The first term coarsely sorts $\Im$: a dependency is more likely to be true if at least one of $R_{DV}(D)$ or $R_{IV}(D)$ or $R_{PSEM}(D)$ is high. The product terms perform finer grain sorting amongst equals. If a true dependency is lower in all of $R_{DV}(D)$, $R_{IV}(D)$, and $R_{PSEM}(D)$ then it receives a lower berth in the sorted $\Im$.

With regard to Dealing with Multiple Instances and/or Encrypted Values, in a solution S which has multiple instances of components, the solution developers have a tendency to keep a product's recommended or default configuration values; for example, the value of 50000 for a database server port. If, for example, there is one DataSource and there are two database servers, then the "databaseport" parameter of the DataSource will be deemed as dependent on the 'port' parameter of each of the two database server instances while constructing the set $\Im$. But only one is true—the one that is associated with that database server whose alias name is the same as the "databaseName" parameter of the DataSource. This is the case of multiple instances of the same dependency type involving a given component instance. The ranking heuristics discussed so far would assign the same rank to both the potential dependencies in the example above. In order to differentiate the true dependency instance, the presence of other dependencies of a given component that are 'unique' (i.e., do not have multiple instances as exemplified above) can be leveraged. The heuristic works as follows. Consider a component instance $C_{xp}$. Assume it has two dependency instances $D:=(C_{xp}.n_a, C_{yq}.n_b)$ and $D':=(C_{xp}.n_a, C_{yr}.n_b)$, where $q \neq r$. Let $R_{avg}(D)$ ($R_{avg}(D')$) be the average of the rank values of all the 'unique' dependencies between $C_{xp}$ and $C_{yq}$ (between $C_{xp}$ and $C_{yr}$) in $\Im$. If $R_{avg}(D)$ is greater than $R_{avg}(D')$ then put D above D' in the sorted $\Im$. If $R_{avg}(D)$ is smaller than $R_{avg}(D')$ then put D below D' in the sorted $\Im$. Otherwise do nothing.

The parameters that have encrypted values, such as passwords, also exhibit the same property in $\Im^E$ as described above. Rank dependencies within $\Im^E$ based on other dependencies (belonging to $\Im$) between a pair of components. Formally, if $D^E:=(C_{xp}.n_a, C_{yq}.n_b) \in \Im^E$. Then $\text{Rank}^E(D^E):=R_{avg}(D)$.

Note that in the case study to follow the provider used did not return any encrypted parameters. Further, since it also did not return any port parameters for the database, it was not possible to construct any dependencies between a DataSource's 'databaseport' parameter and database's 'port' parameter.

Case Study

Two non-limiting exemplary experimental case studies are presented. Each one considers configuration data from a solution created by solution developing units of International Business Machines Corporation, Armonk, N.Y., USA. The table of FIG. 3 shows the total number of instances of subcomponents of the products in a solution. Solution 1 has two component types, namely the 'application server' and the 'database server' types. The Solution 2, on the other hand, has two additional server types—the 'portal server' and the 'messaging server' types.

Note that all the results are purely exemplary in nature, and other instances of the invention may or may not obtain similar results; in general, results might be similar, better, or worse in other instances of the invention.

With reference to the table of FIG. 3, on an average, each subcomponent instance (see the example in the section above on defining configuration dependency) in both the solutions has around ten configuration parameters. In both the case studies, the ground truth is known, that is, which dependencies are true and which are false. Accordingly, the precision can be calculated, as defined below.

'Precision' definition: Let, starting from the top of the candidate list, the last true dependency encountered occur at the $m^{th}$ position in the candidate list. Let $F_{<m}:=\{i: i^{th}$ dependency from the top of the list is a false dependency, $0<i<m\}$ be the list of positions of all the false dependencies before the $m^{th}$ position. The total penalty weight, $w_f$, due to $F_{<m}$ is defined as $\Sigma_{i \in F_{<m}}(m-i)$, where it can be seen that a penalty weight of $(m-i)$ is assigned to the false dependency at the $i^{th}$ position. The sum of weights of all the dependencies above the $m^{th}$ one is $w_{tot}:=m(m-1)/2$. Finally, the precision is defined as:

$$1 - \frac{w_f}{w_{tot}}.$$

Note that the false dependencies which are higher in the list are penalized more. Further, if $F_{<m}$ is a null set then $w_f$ is 0 and hence precision is 1.

Besides 'precision,' the 'position from the top of the last true dependency in the sorted $\Im$' is also of interest. The latter metric gives an immediate estimate of the number of entries from the top in a sorted $\Im$ that must be inspected before encountering all the true dependencies, whereas, for a given value of the latter metric, the former metric is used to evaluate the discriminatory power of a heuristic in terms of its capability to put true dependencies as high as is possible in the sorted $\Im$.

Experiments with Solution 1: Consider the row corresponding to Solution 1 in the table of FIG. 4. There are only five true dependencies in Solution 1 (these are of the type DataSource's 'databaseName' parameter to Database's 'Database alias' parameter). The precision is 40%. This precision should be seen in the light of the fact that the size of $\Im$ is 23020, really large for manual inspection, and also given that the person who is inspecting it to identify the true dependencies has no domain knowledge about the various components in the solution. However, after sorting using the Rank (D) function (as discussed above), the last true dependency lies at only the $11^{th}$ position from the top in the sorted $\Im$. Further experiments were carried out with the solution to understand how the individual heuristics (namely, "Infrequent Valued," "Different Valued," and "PSEM") contributed to the aggregate rank being computed by Rank(D). The results of this experiment are presented in the table of FIG. 5.

Note that the table of FIG. 4 shows the number of true dependencies; size of the candidate list $\Im$; Precision, and the position of the last true dependency in $\Im$, when $\Im$ is sorted using Rank(D). Furthermore, the table of FIG. 5 shows how different heuristics play-out in sorting the candidate list $\Im$, including precision value, when the candidate list $\Im$ is sorted in the descending order of the rank component from the individual heuristics. The number within brackets is the position of the last true dependency from the top in the sorted list $\Im$.

The first, second, and fourth columns in the table of FIG. 5 correspond to the precision numbers (those without brackets) when $\Im$ is sorted in the descending order using $R_{IV}(D)$, $R_{DV}(D)$ and $R_{PSEM}(D)$, respectively. The third column is essentially an aggregation of $R_{IV}(D)$ and $R_{DV}(D)$ together in the manner shown in the header of the column. The third column shows how the combination of the two heuristic rank components together can help each other in giving a good overall rank across the two different solutions. Note, when combining the three rank components together to compute Rank(D), the precision results are shown in the table of FIG. 4 for the two solutions. The numbers within brackets in the table of FIG. 5 correspond to the position from the top of the last true dependency in the sorted $\Im$.

Consider the low precisions obtained from the individual heuristics in the table of FIG. 5. Observe that the precision numbers for $R_{IV}(D)$ are poor for Solution 1 for the following reason: one of the values assumed by a true dependency between DataSource's 'databaseName' parameter and Database's 'Database alias' parameter occurs more frequently in $\Im$ than the values assumed by some of the parameters involved in the false dependencies. This makes the "Infrequent Values" heuristic 'push up' these false dependencies which assume values that occur more infrequently than the value assumed by the true dependency when $\Im$ is sorted using $R_{IV}(D)$. Also observe that the precision numbers for $R_{DV}(D)$ are poor as well, and the reason for this is that there were some other false dependencies whose computed $R_{DV}(D)$ values were identical to the rank values corresponding to the true dependencies and hence the 'Different Values' could not differentiate between the true and false ones in Solution 1. But when $R_{IV}(D)$ and $R_{DV}(D)$ are combined together as in the third column, it can be seen that not only the precision, but also the position of the last true dependency in the sorted list make a marked improvement. Precision from "PSEM" was 100% in this example. This helped increase the overall precision to 40% (see the table of FIG. 4).

Figure 6:
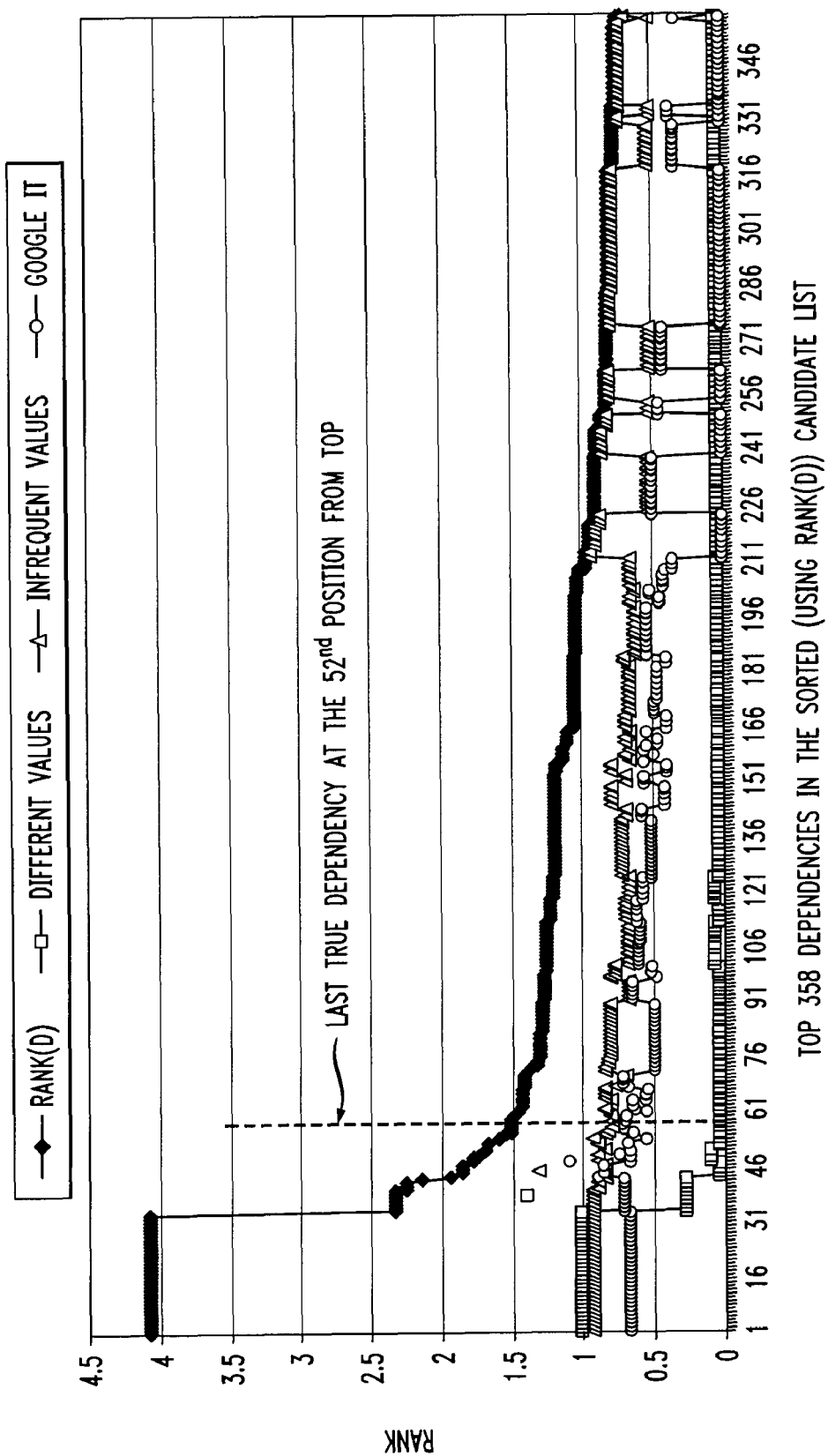
FIG. 6 shows, for solution 2 of FIG. 3, the first 358 dependencies in the candidate list, sorted in the descending order of the rank.

Experiments with Solution 2: In Solution 2 there are four true dependency types: (a) a dependency between portal server's 'URL' and application server's 'uri' parameters denoted as (URL-and-URI), having 32 instances, (b) the dependency between DataSource component of an application server and database system (described earlier as well) denoted as (databaseName-and-Database alias), and having 9 instances, (c) a dependency between application server's 'queueManager' and messaging server's 'QMName' parameters denoted as (queueManager-and-QMName), and having 1 instance only, and (d) another dependency between application server's 'baseQueueName' and messaging server's 'Display Name' parameters denoted as (baseQueueName-and-Display Name), which also has 1 instance only. The latter two dependencies are also the 'culprits' in the "Different Valued" method. While sorting via "Different Valued" they both occur very low in the list (see the table of FIG. 5) causing the precision value to be quite low. However, together with "Infrequent Valued" and "PSEM," the precision due to Rank (D) is 96% (see the table of FIG. 4). "PSEM" for Solution 2 performs reasonably well in terms of putting the last true dependency at the $51^{st}$ position in the list, but it also puts a few false dependencies right at the top, causing a drop in the precision value. FIG. 6 graphically compares the rank values for the top 358 dependencies for Solution 2. In particular, FIG. 6 shows the first 358 dependencies in the candidate list, sorted in the descending order of the Rank(D), along with their 'Different Valued' Rank, 'Infrequent Valued' Rank, and PSEM Rank.

Consider how, in practice, a user can know how many dependencies from the top to consider in a sorted $\Im$ before encountering all the true dependencies. If the user has an estimate of the number of (true) dependencies, say N, in a system, and assuming that a technique in accordance with aspects of the invention gives a precision of p, then the maximum number of dependencies to investigate, say Q, can be obtained based on the definition of Precision, given above. It can be worked out that Q is given by $N+(b+\sqrt{b^2+4p(1-p)N(N-1)})/2p$, where $b:=(1-p)(2N-1)-1)$. If p=0.4 and N=5 (as is the case for Solution 1 in the table of FIG. 4) then Q≈19, while in reality, the last true dependency is at the $11^{th}$ position. Similarly, in the case of Solution 2, taking N=43 and p=0.4 then Q would be 187 (which is just 0.28% of the entire search space).

Improving dependency results: it is presently believed that there exists a unique dependency between the related components. As an example, the unique and/or defining dependency between a DataSource and a database is the (databaseName-and-Database alias) dependency discussed earlier as well. Other dependencies of the DataSource on database port or the password can be identified based on the above unique dependency as discussed in the above section on dealing with multiple instances and/or encrypted values. Thus, in one or more instances, the problem boils down to ensuring that these unique dependencies between various components are placed higher up in the sorted list. Solutions that have multiple instances of these unique dependencies by definition assume different values and hence will be rated higher. Thus, one or more embodiments of the invention provide a more reliable result when run on a solution that has many unique instances of the dependencies. The results may also be improved by merging candidate lists from different unrelated solutions, so as to increase the instances of these unique dependencies and in the process strengthening the "Different Valued" heuristic in identifying these unique dependencies better.

In another aspect, the user defines a set of tests that when implemented on the solution can be used to verify if the solution is running correctly. A program can be written that investigates the various dependencies in the sorted candidate list by successively picking one dependency pair from the list and varying the values assumed by the two parameters in it so that they become different. It then executes the set of tests on the solution to see if it runs as expected. In case the implementation of any of the tests fail, then it is taken to be a true dependency; otherwise, it is a false dependency. This exemplary method assumes that: (1) the coverage of the tests on the solution is complete, and (2) the types of the values assumed by the variables are known.

One or more embodiments of the invention advantageously permit estimating fine-grained dependencies which are not explicitly mentioned in any of the repositories. Furthermore, one or more embodiments of the invention provide dependencies at the level of configuration parameters, which can be used to enhance the granularity of the dependency graph, leading to much better and pin-pointed root-cause analysis.

Aspects of the invention provide a method that analyzes configuration data (namely parameter name-value pairs) to estimate the configuration parameter dependencies. A brute force method to answer the query "what are the configuration dependencies in a given solution?" could consider each pair of parameters from any two sub-components, belonging to different products in the solution. Then a parameter will be chosen from each selected sub-component and an investigation could be performed to know if they are indeed dependent (as in the sense defined above). The investigation will simply discard the pair of parameters if the values assumed by these parameters in the solution are not related as in the definition of configuration dependency section above; otherwise, it will either involve a user's domain knowledge or judgment to decide whether there is a relationship or not, or an automated program may execute that may actually change the parameter values in a predefined manner and run a test workload to see if the solution responds in a desirable manner or not (the latter may not be possible to do on a production system). In the absence of any other knowledge, one or more embodiments of the invention advantageously provide a list of candidate dependencies in which the true dependencies are more likely to be on the top. The investigation process (manual or automated) can make use of the rank along with the parameter names and values for each dependency to make an informed decision on whether to take that dependency as true or not. Another aspect of one or more embodiments addresses how information on the web can be used for the purposes of estimating configuration dependencies. One or more embodiments of the invention may reduce the search space by, for example, several orders of magnitude (although this is not to be taken as limiting).

Figure 7:
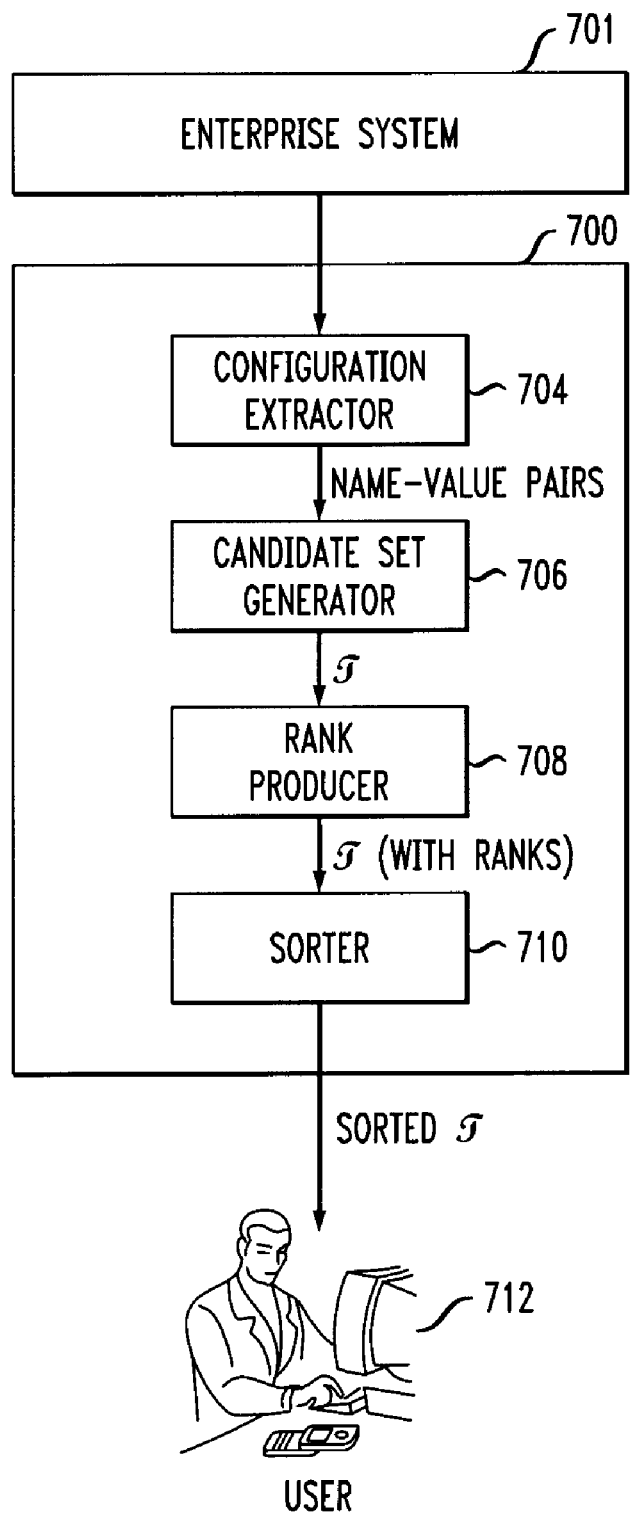
FIG. 7 is a block diagram of an exemplary software architecture, according to another aspect of the invention.

FIG. 7 presents a block diagram 700 of an exemplary system, according to an aspect of the invention. In one or more embodiments, the functionality of system 700 can be structured into four basic components, namely, configuration extractor 704, candidate set generator 706, rank producer 708, and sorter 710. In order for a system administrator or a user 712 to generate the sorted list of configuration dependencies for a given enterprise system 701, the configuration extractor 704 is used to extract the parameter name-value pairs. Extractor 704 may also use third party tools for extracting these name-value pairs. The configuration extractor 704 output of name-value pairs is then used by candidate set generator 706 to compute candidate pairs of parameters. The output of 706 is a set of such parameter pairs $\Im$ which includes the true and false dependencies. The output is further analyzed by the rank producer 708. Rank producer 708 is responsible for running different (optionally pluggable) heuristics to compute a final rank value based on ranks of the individual heuristics. The candidate set $\Im$ (with ranks) now carries a rank for each of the elements in the set. This candidate set is then sorted by the sorter component 710. The sorted list sorted $\Im$ is sent to the user 712. The sorted list may be displayed to the end user 712 as is or a graphical view may be created showing the various configuration parameters as nodes of the graph and the dependencies between them as edges of the graph. Based on the rank of the dependencies the rendering may show the thickness of the edge. User 712 may be afforded the option to only use a subset of the heuristics in the rank producer component 708 (for example the user may just want to do the ranking based on the PSEM heuristic, and so on).

Figure 8:
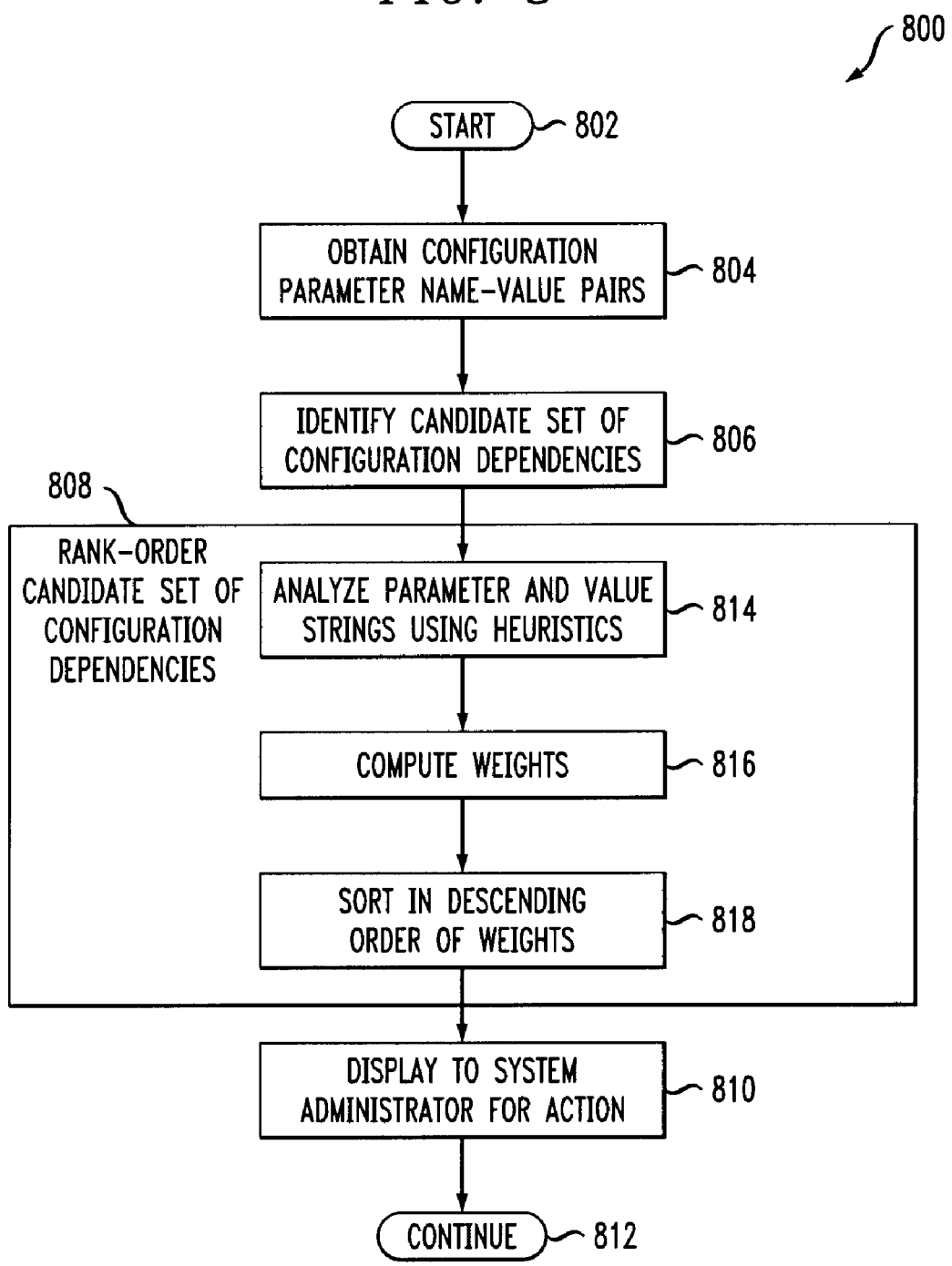
FIG. 8 is a flow chart of exemplary method steps, according to still another aspect of the invention.

Reference should now be had to flow chart 800 of FIG. 8. After beginning at step 802, step 804 includes obtaining configuration parameter name-value pairs for each of a plurality of component instances in a deployed software solution. Step 804 may be carried out, for example, with configuration extractor 704. Step 806 includes identifying a candidate set of configuration dependencies between different ones of the plurality of component instances in the deployed software solution, based on the configuration parameter name-value pairs obtained in the obtaining step 804. Step 806 may be carried out, for example, with candidate set generator 706. The candidate set of configuration dependencies include true dependencies and false dependencies. Step 808 includes rank-ordering the candidate set of configuration dependencies to obtain a rank-ordered list, such that a probability of the true dependencies getting a higher rank is greater than a probability of the false dependencies getting a higher rank. Step 808 may be carried out, for example, using at least rank producer 708. Optional step 810 includes displaying the rank-ordered list to a system administrator (for example, so that appropriate action can be taken). Step 810 may be carried out, for example, using display 1006, discussed below. Processing continues at step 812.

In some instances, the identifying step 806 includes accessing the configuration parameter name-value pairs via vendor-specific configuration parameter access application program interfaces. Furthermore, identifying step 806 can include computing the candidate set as $\Im \cup \Im^E$, using relationships (1) and (2) above.

In one or more embodiments, the candidate set of configuration dependencies includes a plurality of parameter and value strings, and the rank-ordering step 808 includes sub-steps 814, 816, and 818. Step 814 includes analyzing the plurality of parameter and value strings, using heuristics, to estimate weighting statistics. Step 816 includes computing weights for each of the configuration dependencies in the candidate set, based on the weighting statistics. Step 818 includes sorting the configuration dependencies in the candidate set in descending order of the weights to obtain the rank-ordered list. These steps may be carried out, for example, using rank producer 708 and sorter 710. In one or more embodiments, steps 814 and 816 may be carried out in rank producer 708 and step 818 may be carried out in sorter 710.

In one or more embodiments, in the step 814 of analyzing the plurality of parameter and value strings, the heuristics comprise a different-valued dependency rank component, an infrequently-valued dependency rank component, and a parameter semantic distance (in one or more embodiments, for example, the NGD or Normalized Google Distance or Google-distance for short) rank component. Furthermore, in such a case, the steps 816, 818 of computing weights and sorting the configuration dependencies are carried out by aggregating the different-valued dependency rank component, the infrequently-valued dependency rank component, and the parameter semantic distance rank component. In one or more instances, the different-valued dependency rank component is given by expression (3) above, the infrequently-valued dependency rank component is given by expression (4) above, and the parameter semantic distance rank component is given by expression (5) above. Furthermore, in one or more embodiments, the aggregating comprises computing Rank(D) in accordance with expression (6) above.

Yet further, in at least some cases, an additional step can include conducting web queries using pairs of parameter names to compute at least one of a weight and a strength of dependency between members of a given one of the pairs of the parameter names; for example, using expression (5)

above. The rank-ordering step 808 takes into account the computed one of a weight and a strength of dependency.

Dependency information determined by a method, apparatus, and/or computer program product according to one or more embodiments of the invention can be used for a variety of things; for example, to reconfigure a physical system. For example, assume an application running on an application server that has a configuration parameter "dbip," the IP address of the database used by the application. Assume migration of the database to another machine with another IP address. There are a host of reasons for doing this migration including, for example, faster hardware, consolidation of servers, and the like. Now, once the database is migrated to the new server, it gets a new IP address. Unless "dbip" is changed to reflect the new IP address, the application will fail to work. Therefore, a system administrator must change the value of "dbip" to the new IP address. However, since it can be assumed that the dependency ("dbip," ipaddress of database) is not known to the system administrator, the system administrator will use the sorted list of dependencies provided by one or more embodiments of the invention. It is expected that the true dependency ("dbip," ipaddress of database) will be at the helm of the list. Thus, after migration of the database, though initially the database will not function properly, in essentially "no time at all" (that is, sufficiently quickly to avoid or significantly reduce a negative impact on system performance) the system administrator will use the sorted list to set the "dbip" value to the new value. The list in accordance with one or more embodiments of the invention provides the true dependencies at the top of the list, thus saving valuable time for the system administrator as well as for the business owning the information technology (IT) application. This is but one non-limiting example of reconfiguring a deployed physical IT system in accordance with ordered dependency information provided by one or more embodiments of the invention.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figures 9, 10:
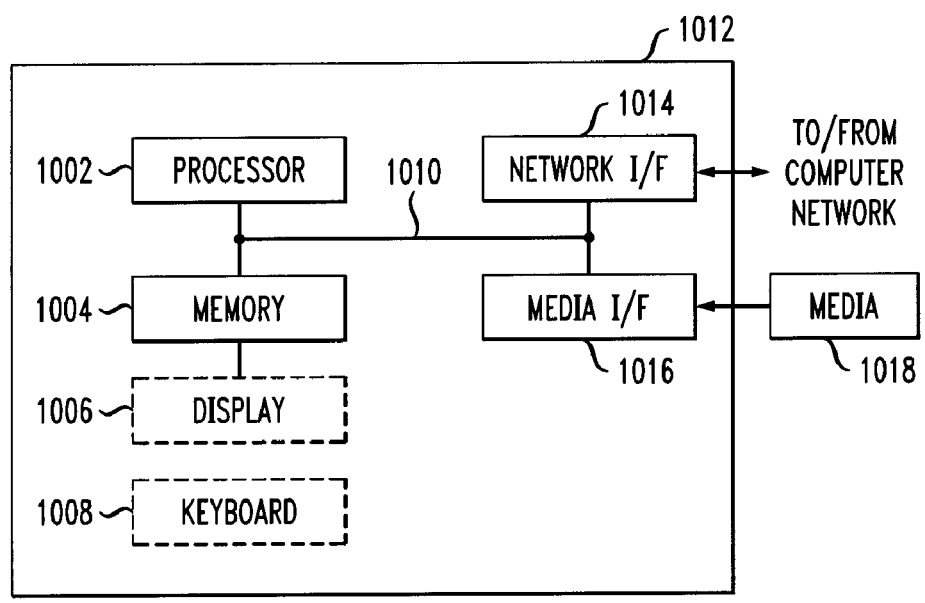
FIG. 9 is a listing of exemplary uniform resource locators placed in a figure to avoid having browser-executable code in the specification text.
FIG. 10 depicts a computer system that may be useful in implementing one or more aspects and/or elements of the invention.

One or more embodiments can make use of software running on a general purpose computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 1018) providing program code for use by or in connection with a computer or any instruction implementation system. For the purposes of this description, a computer usable or computer readable medium can be any apparatus for use by or in connection with the instruction implementation system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable recordable storage medium (as distinct from a propagation or transmission medium) include a semiconductor or solid-state memory (for example memory 1004), magnetic tape, a removable computer diskette (for example media 1018), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable recordable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable recordable storage medium; the modules can include, for example, any or all appropriate components, such as components 704, 706, 708, and 710. The method steps can then be carried out using the distinct software modules and/or sub-modules of the system, as described above, executing on one or more hardware processors 1002. Further, a computer program product can include a tangible computer-readable recordable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    obtaining configuration parameter name-value pairs for each of a plurality of component instances, wherein the plurality of configuration parameters are obtained from a deployed software solution;
    identifying a candidate set of configuration dependencies between different ones of the plurality of component instances in the deployed software solution, based on the configuration parameter name-value pairs obtained, wherein the candidate set of configuration dependencies comprise true dependencies and false dependencies;
    rank-ordering the candidate set of configuration dependencies to obtain a rank-ordered list, wherein the true dependencies get a higher rank than the false dependencies in the rank-ordered list; and
    conducting web queries using pairs of the parameter names to compute at least one of a weight and a strength of dependency between members of a given one of the pairs of the parameter names, wherein the rank-ordering step takes into account the computed one of a weight and a strength of dependency.

2. The method of claim 1, wherein the identifying step comprises accessing the configuration parameter name-value pairs via vendor-specific configuration parameter access application program interfaces.

3. The method of claim 1, wherein:
    the candidate set of configuration dependencies comprises a plurality of parameter and value strings; and
    the rank-ordering step comprises:
        analyzing the plurality of parameter and value strings, to estimate weighting statistics;

computing weights for each of the configuration dependencies in the candidate set, based on the weighting statistics; and sorting the configuration dependencies in the candidate set in descending order of the weights to obtain the rank-ordered list.

4. The method of claim 3, further comprising, in the step of analyzing the plurality of parameter and value strings using heuristics comprising:

a different-valued dependency rank component;

an infrequently-valued dependency rank component; and a parameter semantic distance rank component;

wherein the steps of computing weights and sorting the configuration dependencies are carried out by aggregating the different-valued dependency rank component, the infrequently-valued dependency rank component, and the parameter semantic distance rank component.

5. The method of claim 1, further comprising displaying the rank-ordered list to an administrator.

6. The method of claim 5, further comprising reconfiguring a deployed physical information technology system in accordance with the displayed rank-ordered list.

7. The method of claim 1, further comprising providing a system, wherein the system comprises distinct software modules, each of the distinct software modules being embodied on a tangible computer-readable recordable storage medium, and wherein the distinct software modules comprise a configuration extractor module, a candidate set generator module, and a rank producer module;

wherein:

the obtaining of the configuration parameter name-value pairs is carried out by the configuration extractor module executing on at least one hardware processor;

the identifying of the candidate set of configuration dependencies is carried out by the candidate set generator module executing on the at least one hardware processor; and the rank-ordering of the candidate set of configuration dependencies is carried out at least by the rank producer module executing on the at least one hardware processor.

8. A computer program product comprising a tangible computer readable recordable storage medium including computer usable program code, the computer program product including:

computer usable program code for obtaining configuration parameter name-value pairs for each of a plurality of component instances, wherein the plurality of configuration parameters are obtained from a deployed software solution;

computer usable program code for identifying a candidate set of configuration dependencies between different ones of the plurality of component instances in the deployed software solution, based on the configuration parameter name-value pairs obtained, wherein the candidate set of configuration dependencies comprise true dependencies and false dependencies;

computer usable program code for rank-ordering the candidate set of configuration dependencies to obtain a rank-ordered list, wherein the true dependencies get a higher rank than the false dependencies in the rank-ordered list; and computer usable program code for conducting web queries using pairs of the parameter names to compute at least one of a weight and a strength of dependency between members of a given one of the pairs of the parameter names, wherein the rank-ordering step takes into account the computed one of a weight and a strength of dependency.

9. The computer program product of claim 8, wherein the computer usable program code for identifying comprises computer usable program code for accessing the configuration parameter name-value pairs via vendor-specific configuration parameter access application program interfaces.

10. The computer program product of claim 8, wherein:

the candidate set of configuration dependencies comprises a plurality of parameter and value strings; and the computer usable program code for rank-ordering comprises:

computer usable program code for analyzing the plurality of parameter and value strings, to estimate weighting statistics;

computer usable program code for computing weights for each of the configuration dependencies in the candidate set, based on the weighting statistics; and computer usable program code for sorting the configuration dependencies in the candidate set in descending order of the weights to obtain the rank-ordered list.

11. The computer program product of claim 10, wherein:

the computer usable program code for analyzing the plurality of parameter and value strings comprises computer usable program code for using heuristics comprising:

a different-valued dependency rank component;

an infrequently-valued dependency rank component; and a parameter semantic distance rank component; and the computer usable program code for computing weights and sorting the configuration dependencies comprises computer usable program code for aggregating the different-valued dependency rank component, the infrequently-valued dependency rank component, and the parameter semantic distance rank component.

12. The computer program product of claim 8, further comprising distinct software modules, each of the distinct software modules being embodied on the tangible computer-readable recordable storage medium, the distinct software modules comprising a configuration extractor module, a candidate set generator module, and a rank producer module;

wherein:

the configuration extractor module comprises the computer usable program code for obtaining the configuration parameter name-value pairs;

the candidate set generator module comprises the computer usable program code for identifying the candidate set; and the rank producer module comprises the computer usable program code for rank-ordering the candidate set of configuration dependencies.

13. An apparatus comprising:

a memory; and at least one processor, coupled to the memory, and operative to:

obtain configuration parameter name-value pairs for each of a plurality of component instances, wherein the plurality of configuration parameters are obtained from a deployed software solution;

identify a candidate set of configuration dependencies between different ones of the plurality of component instances in the deployed software solution, based on the configuration parameter name-value pairs obtained, wherein the candidate set of configuration dependencies comprise true dependencies and false dependencies;

rank-order the candidate set of configuration dependencies to obtain a rank-ordered list, wherein the true dependencies get a higher rank than the false dependencies; and conduct web queries using pairs of the parameter names to compute at least one of a weight and a strength of dependency between members of a given one of the pairs of the parameter names, wherein the rank-ordering step takes into account the computed one of a weight and a strength of dependency.

14. The apparatus of claim 13, wherein the at least one processor is operative to identify by accessing the configuration parameter name-value pairs via vendor-specific configuration parameter access application program interfaces.

15. The apparatus of claim 13, wherein:
the candidate set of configuration dependencies comprises a plurality of parameter and value strings; and
the at least one processor is operative to rank-order by:
analyzing the plurality of parameter and value strings, to estimate weighting statistics;
computing weights for each of the configuration dependencies in the candidate set, based on the weighting statistics; and
sorting the configuration dependencies in the candidate set in descending order of the weights to obtain the rank-ordered list.

16. The apparatus of claim 15, wherein:
the at least one processor is operative to analyze the plurality of parameter and value strings using heuristics comprising:
a different-valued dependency rank component;
an infrequently-valued dependency rank component; and
a parameter semantic distance rank component; and
the at least one processor is operative to compute weights and sort the configuration dependencies by aggregating the different-valued dependency rank component, the infrequently-valued dependency rank component, and the parameter semantic distance rank component.

17. The apparatus of claim 13, further comprising a tangible computer-readable recordable storage medium having distinct software modules embodied thereon, wherein the distinct software modules comprise a configuration extractor module, a candidate set generator module, and a rank producer module;

wherein:
the obtaining of the configuration parameter name-value pairs is carried out by the configuration extractor module executing on the at least one processor;
the identifying of the candidate set of configuration dependencies is carried out by the candidate set generator module executing on the at least one processor; and
the rank-ordering of the candidate set of configuration dependencies is carried out at least by the rank producer module executing on the at least one processor.

18. An apparatus comprising:
means for obtaining configuration parameter name-value pairs for each of a plurality of component instances, wherein the plurality of configuration parameters are obtained from a deployed software solution;
means for identifying a candidate set of configuration dependencies between different ones of the plurality of component instances in the deployed software solution, based on the configuration parameter name-value pairs obtained, the candidate set of configuration dependencies comprising true dependencies and false dependencies;
means for rank-ordering the candidate set of configuration dependencies to obtain a rank-ordered list, wherein the true dependencies get a higher rank than the false dependencies; and
means for conducting web queries using pairs of the parameter names to compute at least one of a weight and a strength of dependency between members of a given one of the pairs of the parameter names, wherein the rank-ordering step takes into account the computed one of a weight and a strength of dependency.

* * * * *